US010887197B2

(12) United States Patent
Fenoglio et al.

(10) Patent No.: US 10,887,197 B2
(45) Date of Patent: Jan. 5, 2021

(54) DEEP FUSION REASONING ENGINE (DFRE) FOR DYNAMIC AND EXPLAINABLE WIRELESS NETWORK QOE METRICS

(71) Applicant: Cisco Technology, Inc., San Jose, CA (US)

(72) Inventors: Enzo Fenoglio, Issy-les-Moulineaux (FR); Hugo M. Latapie, Long Beach, CA (US); Kenneth Gray, Frederick, MD (US); Sawsen Rezig, Nanterre (FR); David Delano Ward, Somerset, WI (US)

(73) Assignee: Cisco Technology, Inc., San Jose, CA (US)

( * ) Notice: Subject to any disclaimer, the term of this patent is extended or adjusted under 35 U.S.C. 154(b) by 6 days.

(21) Appl. No.: 16/365,096

(22) Filed: Mar. 26, 2019

(65) Prior Publication Data

US 2020/0022016 A1    Jan. 16, 2020

Related U.S. Application Data

(60) Provisional application No. 62/648,489, filed on Mar. 27, 2018, provisional application No. 62/683,214, filed on Jun. 11, 2018.

(51) Int. Cl.
*H04L 12/24* (2006.01)
*H04W 28/02* (2009.01)
*H04L 12/26* (2006.01)

(52) U.S. Cl.
CPC .......... *H04L 41/5009* (2013.01); *H04L 41/16* (2013.01); *H04L 43/08* (2013.01); *H04W 28/0268* (2013.01); *H04L 41/22* (2013.01)

(58) Field of Classification Search
CPC ..... H04L 41/16; H04L 41/5009; H04L 43/08; H04L 41/22; H04W 28/0268
See application file for complete search history.

(56) References Cited

U.S. PATENT DOCUMENTS

2014/0122594 A1  5/2014 Uzunalioglu et al.
2015/0310334 A1  10/2015 Huang
(Continued)

OTHER PUBLICATIONS

Lucas Bechberger et al., "Towards Grounding Conceptual Spaces in Neural Representations," arxiv.org, Nov. 21, 2017, pp. 01-10.
(Continued)

*Primary Examiner* — Min Jung
(74) *Attorney, Agent, or Firm* — Behmke Innovation Group LLC; Kenneth J. Heywood; James J. Wong

(57) ABSTRACT

In one embodiment, a network quality assessment service that monitors a network obtains multimodal data indicative of a plurality of measurements from the network and subjective perceptions of the network by users of the network. The network quality assessment service uses the obtained multimodal data as input to one or more neural network-based models. The network quality assessment service maps, using a conceptual space, outputs of the one or more neural network-based models to symbols. The network quality assessment service applies a symbolic reasoning engine to the symbols, to generate a conclusion regarding the monitored network. The network quality assessment service provides an indication of the conclusion to a user interface.

20 Claims, 8 Drawing Sheets

(56) References Cited

U.S. PATENT DOCUMENTS

2017/0366445 A1  12/2017  Nemirovsky et al.
2019/0196421 A1*  6/2019  Littlefield ........ G06Q 10/06395
2019/0239101 A1*  8/2019  Ouyang ................ H04W 24/04

OTHER PUBLICATIONS

Tsvi Achler, "Symbolic neural networks for cognitive capacities," Semantic Scholar, Jul. 3, 2014, pp. 01-10.
Stefan Schulz et al., "Context-based Retrieval for Explainable Reasoning," Sematics Scholar, 2005, 18 pages.
Sabina Barakovic, "Survey and Challenges of QoE Management Issues in Wireless Networks," Journal of Computer Networks and Communications vol. 2013, 28 pages.
Andre Augusto Pacheco de Carvalho et al., "Prediction Metrics for QoE/QoS in Wireless Video Networks for Indoor Environmental Planning: A Bayesian Approach," ICN 2015: The Fourteenth International Conference on Networks, 6 pages.
Khalil ur Rehman Laghari et al., "Toward total quality of experience: A QoE model in a communication ecosystem," IEEE Communication Magazine, 2012.
Jordi E. Bieger et al., "Requirements for General Intelligence: A Case Study in Trustworthy Cumulative Learning for Air Traffic Control", Semantics Scholar, 2018, 11 pages.
Chris Nicholson, "Artificial Intelligence (AI) vs. Machine Learning vs. Deep Learning", Skymind, https://skymind.ai/wiki/ai-vs-machine-learning-vs-deep-learning, printed Oct. 9, 2019, 6 pages.
Pei Wang et al., "Reasoning in Non-Axiomatic Logic: A Case Study in Medical Diagnosis", ResearchGate, 2011, 11 pages.
"Syllogism", online: https://en.wikipedia.org/w/index.php?title=Syllogism&oldid=878220548, dated Jan. 13, 2019, printed Feb. 8, 2019, 10 pages, Wikimedia Foundation, Inc.

* cited by examiner

DEEP FUSION REASONING ENGINE (DFRE) FOR DYNAMIC AND EXPLAINABLE WIRELESS NETWORK QOE METRICS

RELATED APPLICATIONS

This application claims priority to U.S. Provisional Patent App. No. 62/648,489, filed on Mar. 27, 2018, entitled GOAL-ORIENTED SEMANTIC COLLABORATION AGENTS, by Latapie, et al., and to U.S. Provisional Patent App. No. 62/683,214, filed on Jun. 11, 2018, entitled DEEP FUSION REASONING ENGINE (DFRE), by Latapie et al., the contents both of which are incorporated herein by reference.

TECHNICAL FIELD

The present disclosure relates generally to computer networks, and, more particularly, to a deep fusion reasoning engine (DFRE) for dynamic and explainable wireless network quality of experience (QoE) metrics.

BACKGROUND

Networks are large-scale distributed systems governed by complex dynamics and very large number of parameters. In general, network quality involves applying analytics to captured network information, to assess the health of the network. For example, a network quality service may track and assess metrics such as available bandwidth, packet loss, jitter, and the like, to ensure that the experiences of users of the network are not impinged. However, as networks continue to evolve, so too will the number of applications present in a given network, as well as the number of metrics available from the network.

Quality of Service (QoS) implementations enable network operators to isolate network traffic into flows based on attributes such as traffic type (e.g., voice, video, control, etc.) and/or the needs of the underlying application (e.g., in terms throughput, latency, jitter, etc.). However, QoS neither considers all the content delivered features, nor uses the information provided by terminals and end-users regarding the content processing. In other words, the assumption in using QoS metrics to optimize network traffic is that doing so will also increase the Quality of Experience (QoE), from the standpoint of the end user, which is not always the case.

It is important for network operators and content providers to incorporate a high degree of intelligence to transport different types of network traffic in a way that provides a satisfactory and competitive end-user experience. This is particularly true in the case of wireless networks, where a large number of factors can affect the QoE of the end users. However, the wide variety of factors that can affect QoE in a wireless network also makes identifying and explaining QoE metrics to a network administrator particularly challenging.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
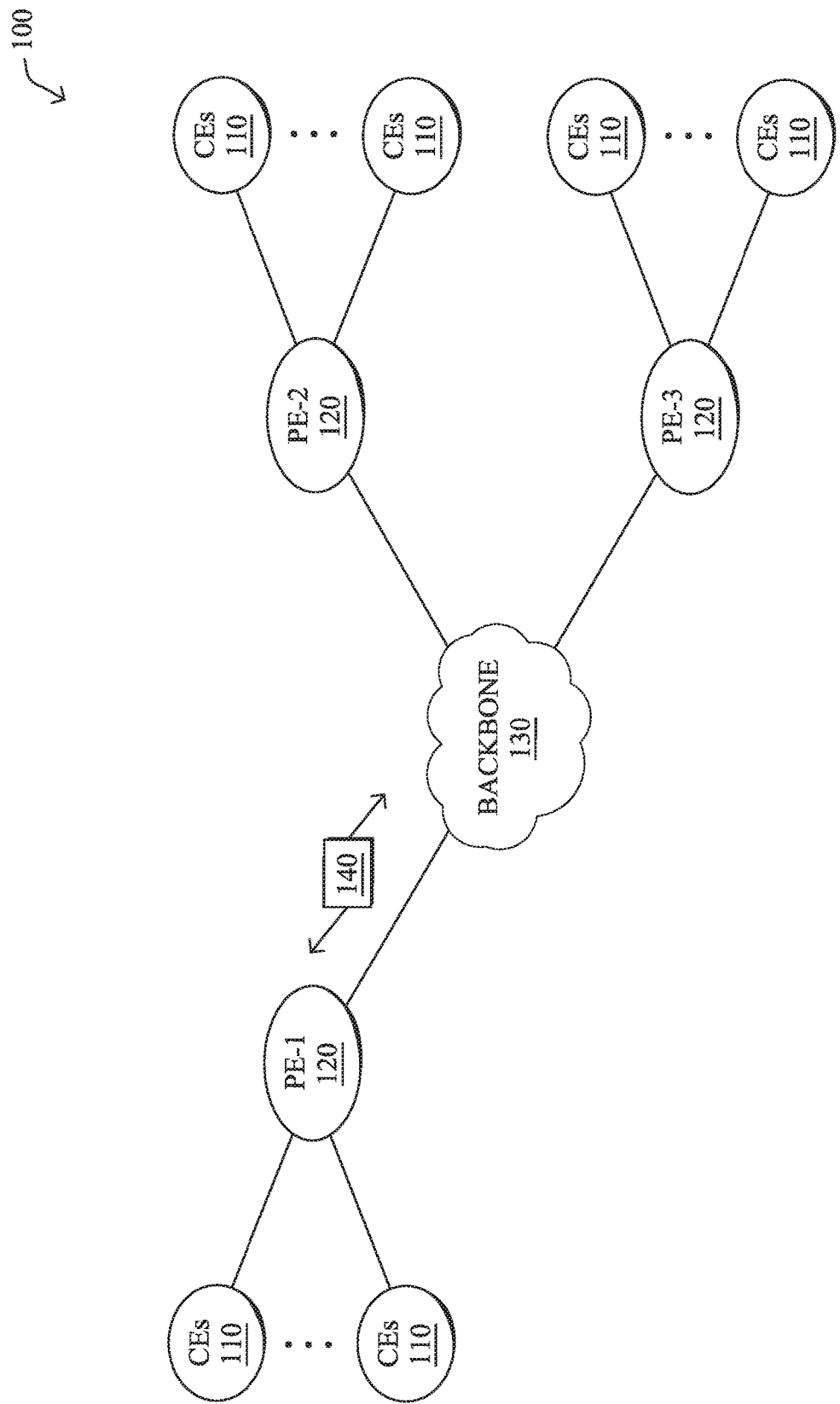
FIGS. 1A-1B illustrate an example communication network.

According to one or more embodiments of the disclosure, a network quality assessment service that monitors a network obtains multimodal data indicative of a plurality of measurements from the network and subjective perceptions of the network by users of the network. The network quality assessment service uses the obtained multimodal data as input to one or more neural network-based models. The network quality assessment service maps, using a conceptual space, outputs of the one or more neural network-based models to symbols. The network quality assessment service applies a symbolic reasoning engine to the symbols, to generate a conclusion regarding the monitored network. The network quality assessment service provides an indication of the conclusion to a user interface.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications)

temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
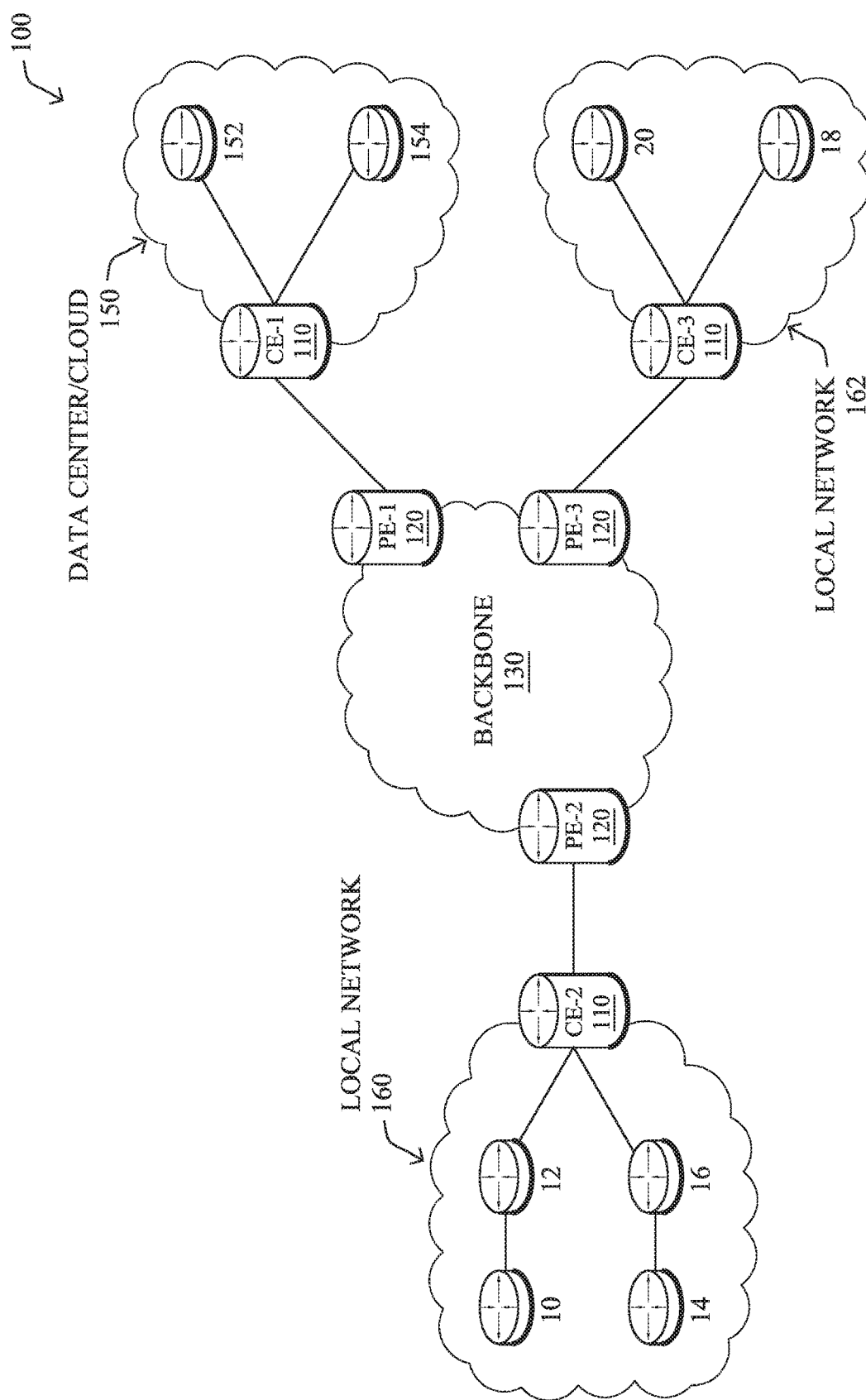

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
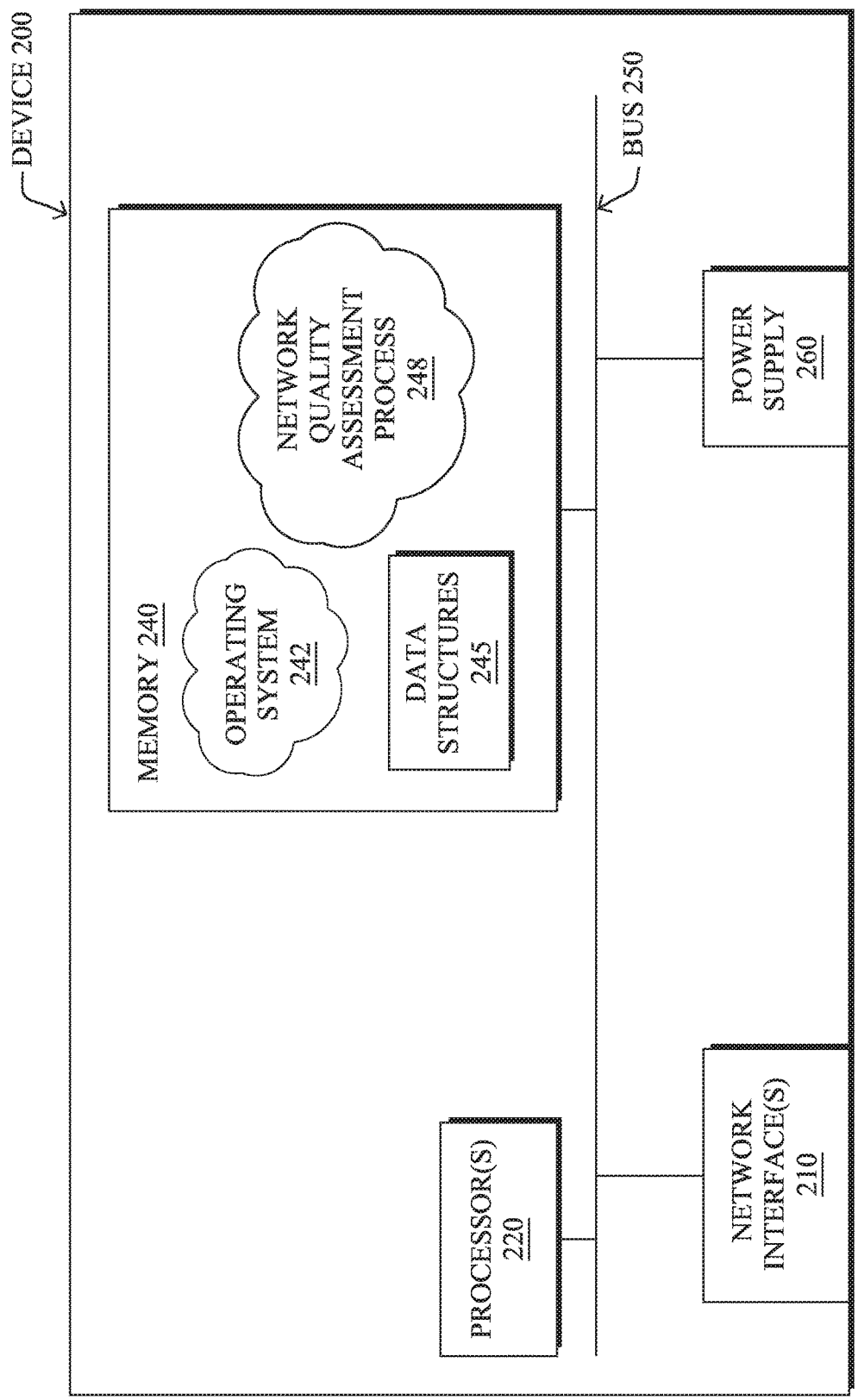
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network quality assessment process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network quality assessment process 248 includes computer executable instructions that, when executed by processor(s) 220, cause device 200 to perform network quality assessment functions as part of a network quality assessment infrastructure within the network. In general, network quality assessment refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In various embodiments, network quality assessment process 248 may also utilize machine learning techniques, to enforce policies, monitor the health of the network, and/or present information to a network administrator in an interpretable manner. In general, machine learning is concerned with the design and the development of techniques that take as input empirical data (such as network statistics and performance indicators) and recognize complex patterns in these data. One very common pattern among machine learning techniques is the use of an underlying model M, whose hyper-parameters are optimized for minimizing the cost function associated to M, given the input data. The learning process then operates by adjusting the hyper-parameters such that the number of misclassified points is minimal. After this optimization phase (or learning phase), the model M can be used very easily to classify new data points. Often, M is a statistical model, and the minimization of the cost function is equivalent to the maximization of the likelihood function, given the input data.

In various embodiments, network quality assessment process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network quality assessment process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) artificial neural networks (ANNs) (e.g., for non-linear models), replicating reservoir networks (e.g., for non-linear models, typically for time series), random forest classification, or the like. Accordingly, network quality assessment process 248 may employ deep learning, in some embodiments. Generally, deep learning is a subset of machine learning that employs ANNs with multiple layers, with a given layer extracting features or transforming the outputs of the prior layer.

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
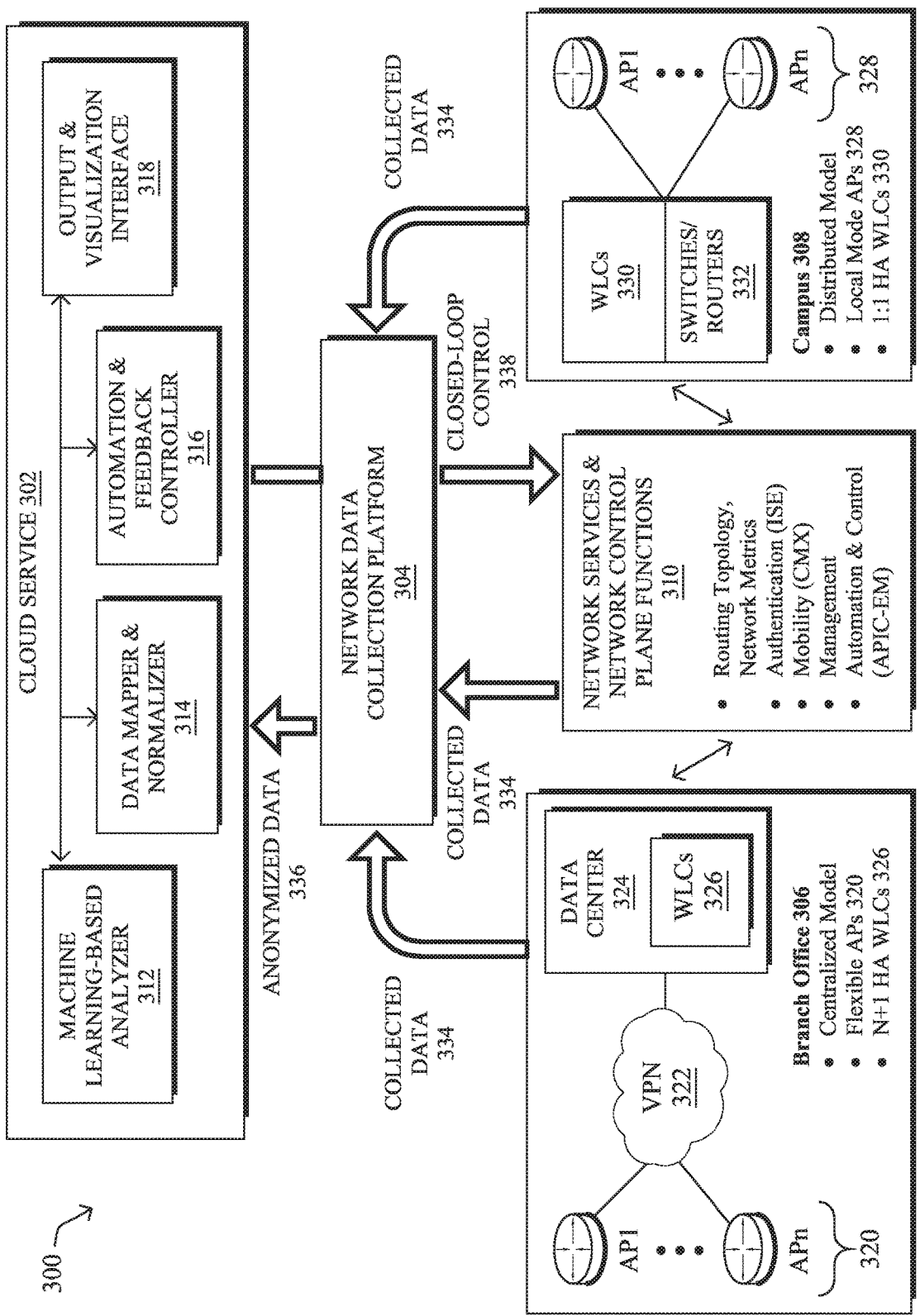
FIG. 3 illustrates an example network quality assessment system.

FIG. 3 illustrates an example network quality assessment system 300, according to various embodiments. As shown, at the core of network quality assessment system 300 may be a cloud-based network quality assessment service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point AP1 through nth access point, APn) through which endpoint nodes may connect. Access points 320 may, in turn, be in communication with any number of wireless LAN controllers (WLCs) 326 (e.g., supervisory devices that provide control over APs) located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point AP1 through $n^{th}$ access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning (ML)-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc.). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network quality assessment system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint client device, networking device in branch office 306 or campus 308, or a network service or control plane function 310, to adjust its operations (e.g., by signaling an endpoint to use a particular AP 320 or 328, etc.).

As noted above, QoS metrics, while useful for purposes of providing different levels of performance to different traffic flows in a network, do not necessarily guarantee a high QoE from the standpoint of a user. Conversely, from the standpoint of a network administrator, QoE metrics also do not directly map to the underlying characteristics of the network. For example, an end user may give the QoE of a video conference a rating of two out of five stars. While this certainly may be an indication to the network administrator that changes to the network are necessary, such a rating provides little guidance to the network administrator in terms of what corrections, if any, would improve the QoE. Moreover, the concept of QoE may be quite different for different people. For example, an end user may have a very different view of what constitutes "good" than that of a network administrator or even a provider of the network.

Deep Fusion Reasoning Engine (DFRE) for Dynamic and Explainable Wireless Network QoE Metrics The techniques herein introduce a cognitive architecture that leverages a deep fusion reasoning engine (DFRE)

capable of providing explainable QoE metrics based on objective and subjective measures for a wireless network. In some aspects, the DFRE may employ a sub-symbolic layer to project raw, multimodal measurements from the network into conceptual spaces from which symbolic information can be obtained. In turn, a symbolic reasoner of the DFRE can use this symbolic information to provide explainable QoE metrics. The overall goal is to optimize the QoE of the network, from the perspective of the user, while making efficient use of networking resources (e.g., QoS) and maintaining a satisfactory level of service, from the standpoint of the service provider (e.g., SLA).

Specifically, in various embodiments, a network quality assessment service that monitors a network obtains multimodal data indicative of a plurality of measurements from the network and subjective perceptions of the network by users of the network. The network quality assessment service uses the obtained multimodal data as input to one or more neural network-based models. The network quality assessment service maps, using a conceptual space, outputs of the one or more neural network-based models to symbols. The network quality assessment service applies a symbolic reasoning engine to the symbols, to generate a conclusion regarding the monitored network. The network quality assessment service provides an indication of the conclusion to a user interface.

Illustratively, the techniques described herein may be performed by hardware, software, and/or firmware, such as in accordance with the network quality assessment process 248, which may include computer executable instructions executed by the processor 220 (or independent processor of interfaces 210), to perform functions relating to the techniques described herein.

Figure 4:
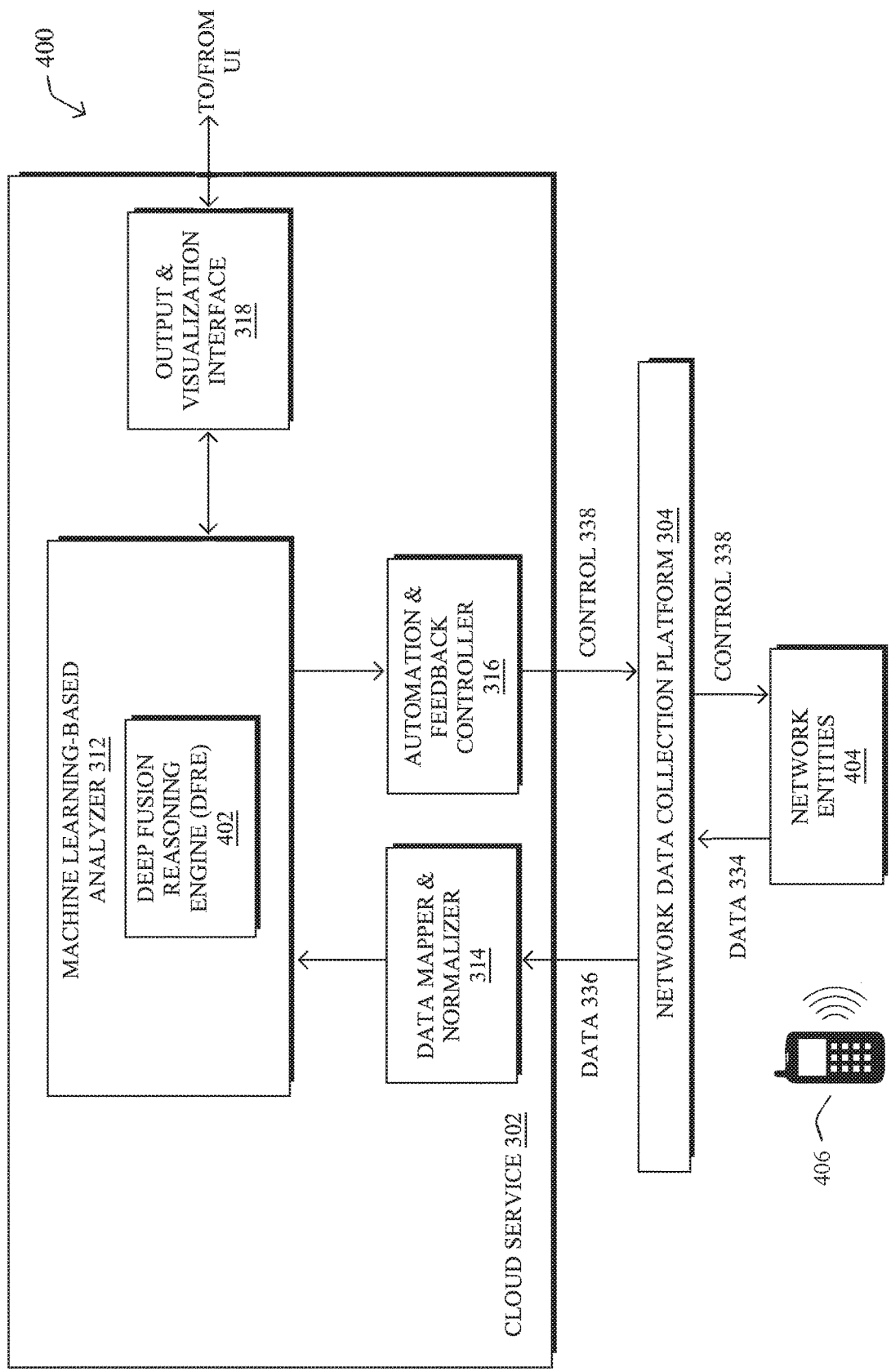
FIG. 4 illustrates an example architecture for providing dynamic and explainable quality of experience (QoE) metrics in a network quality assessment service.

FIG. 4 illustrates an example architecture 400 for providing explainable QoE metrics in a network quality assessment service, according to various embodiments. At the core of architecture 400 may be a deep fusion reasoning engine (DFRE) 402. In some implementations, DFRE 402 may be implemented within a network quality assessment system, such as system 300 shown in FIG. 3. Accordingly, DFRE 402 may be implemented as part of cloud service 302 and, more specifically, as part of machine learning-based analyzer 312, as part of network data collection platform 304, and/or on one or more network elements/entities 404 that communicate with one or more client devices 402 within the monitored network itself. Further, DFRE 402 may be implemented in a distributed manner or implemented as its own stand-alone service, either as part of the local network under observation or as a remote service. In addition, the functionalities of the components of architecture 400 may be combined, omitted, or implemented as part of other processes, as desired.

During operation, service 302 may receive data regarding the monitored network (e.g., anonymized data 336 and/or data 334) and, in turn, assess the received data using DFRE 402 to provide explainable QoE metrics/conclusions regarding the network to a user interface (UI) via output and visualization interface 318. Example data that network data collection platform 304 may collect and provide to cloud service 302 may include, but is not limited to, any or all of the following:

Network topology information—e.g., the identities of network entities 404 and information regarding how they are interconnected.

Configuration information—e.g., how network entities 404 and/or client 406 are configured.

Device profile information—e.g., the make, model, software version, etc., of client 406 and/or network entities 404.

Device operational information—e.g., the queue states, CPU or other resource loads, number of connected clients, etc. of network entities 404.

Sensor/Telemetry data—e.g., any or all information regarding the traffic flows in the monitored network and/or the environmental conditions of the network. For example, this data may include YANG/NETCONF information, Netflow or IPFIX information, QoS or QoE information, location services information, wireless AP or WLC measurements such as Peak Signal to Noise Ratio (PSNR), Received Signal Strength Indicator (RSSI), or the like.

Business entity interactions—e.g., interactions between subscribers, network operators, and/or service providers, to identify any environmental and service factors that may influence the QoE, such as age, gender, service satisfaction, usefulness, etc.

Classical machine learning approaches to assessing the data collected from the monitored network do not afford any explainability, due their black box nature. For example, in the case of deep learning-neural networks (DNNs), there may be any number of layers between the input layer and the output layer that perform transformations on the data from the previous layer. In other words, while the machine learning model may produce the 'correct' output given the input data, how and why the model actually arrived at its output decision remains hidden.

In contrast to machine learning, expert systems, also sometimes referred to as "Good Old-Fashioned Artificial Intelligence" (GOFAI) use a static set of knowledge rules that may provide some degree of explainaiblity for a decision/output. However, these approaches are also static in nature and require constant updating by domain experts with new sets of rules in the case of new scenarios.

Figure 5:
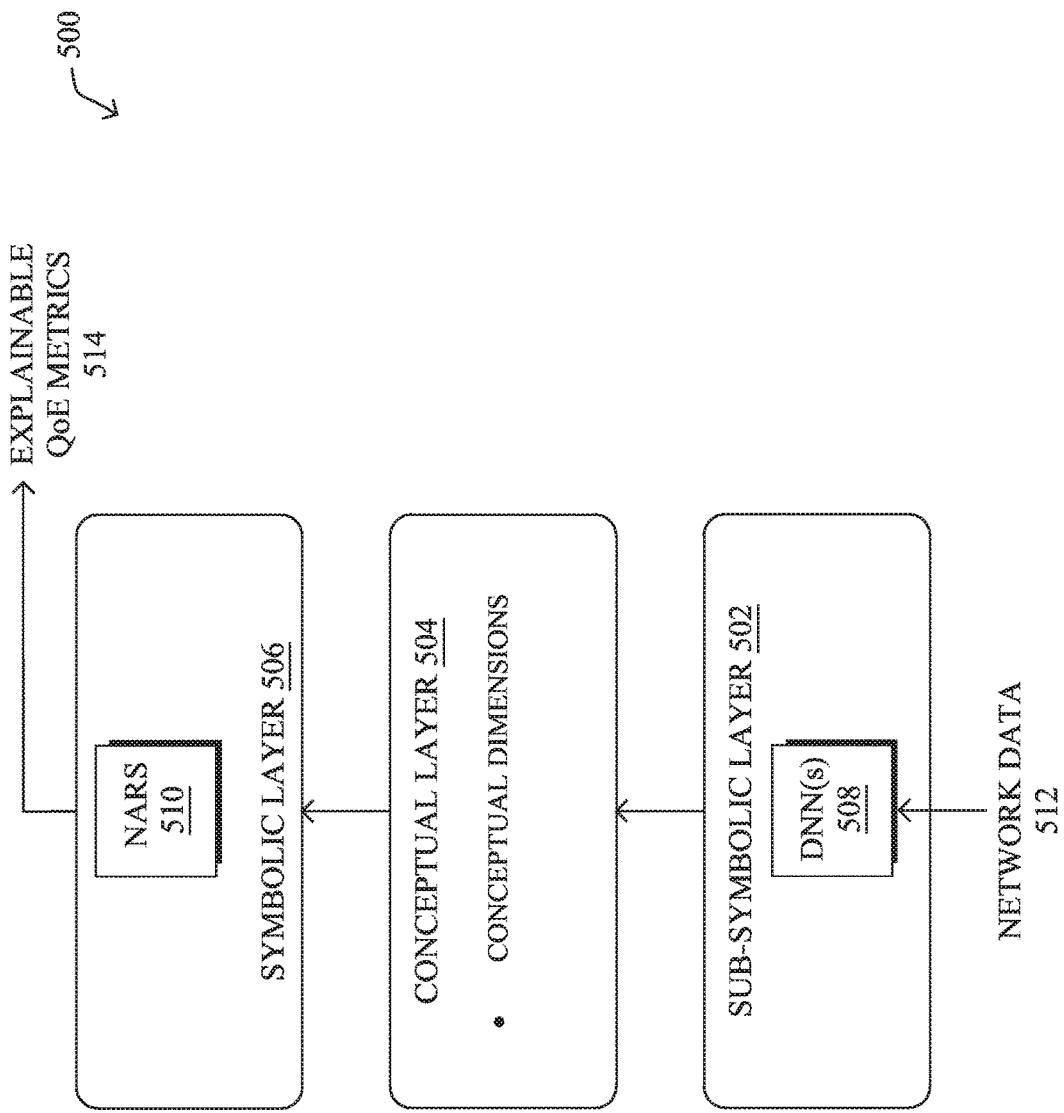
FIG. 5 illustrates an example layer hierarchy for providing explainable QoE metrics for a network.

According to various embodiments, FIG. 5 illustrates an example layer hierarchy 500 for providing explainable QoE metrics for a network. For example, DFRE 402 described with respect to FIG. 4 may implement layer hierarchy 500, to generate and provide QoE explainable metrics 514 for presentation to a user interface.

At the lowest layer of hierarchy 500 is sub-symbolic layer 502 that processes the multimodal network data 512 collected from the network under scrutiny. For example, at the core of sub-symbolic layer 502 may be one or more DNNs 508 or other machine learning-based model that processes the multimodal network data 512 collected from the network, service providers, network operators, and/or network subscribers. In other words, sub-symbolic layer 502 may perform sensor fusion on network data 512 to identify relationships between the data that would otherwise be undetectable.

Various scenarios are possible to generate sub-symbolic processors in the context of providing explainable QoE metrics 514 such as, but not limited to, any or all of the following:

Scenario 1: This scenario may entail DNN 508 processing the data stream of network data 512, such as Netflow or IPFIX data, network topology information, YANG/NETCONF information, data from location-based services etc., for purposes of detecting, predicting, and potentially preventing degradation in the wireless network. For example, DNN 508 may employ deep learning to learn probable cause relationships between the characteristics of the network and the QoE metrics. For example, DNN 508 may identify the relationships between the physical layout of APs in the network, the wireless client device types, the active client workloads, wireless client densities, or the like, and their effect on the QoE experienced by the wireless clients of the network.

Scenario 2: In this scenario, sub-symbolic layer 502 can be extended to perform cross site correlations that need to be examined, as well as further analysis of external data streams. In this case, network data 512 may include data from any number of wireless networks that are monitored by the network quality assessment service.

At the top of hierarchy 500 may be symbolic layer 506 that may leverage symbolic learning to perform the functions described herein. In general, symbolic learning includes a set of symbolic grammar rules specifying the representation language of the system, a set of symbolic inference rules specifying the reasoning competence of the system, and a semantic theory containing the definitions of "meaning." This approach differs from other learning approaches that try to establish generalizations from facts as it is about reasoning and inferring knowledge from knowledge. In other words, in sharp contrast to the sub-symbolic learning performed in layer 502, the symbolic learning and generalized intelligence performed on a human scale at symbolic layer 506 requires a variety of reasoning and learning paradigms that more closely follows how humans learn and are able to explain why a particular conclusion was reached.

Symbolic learning models what are referred to as "concepts," which comprise a set of properties. Typically, these properties include an "intent" and an "extent," whereby the intent offers a symbolic way of identifying the extent of the concept. For example, consider the intent that represents motorcycles. The intent for this concept may be defined by properties such as "having two wheels" and "motorized," which can be used to identify the extent of the concept (e.g., whether a particular vehicle is a motorcycle).

Linking sub-symbolic layer 502 and symbolic layer 506 may be conceptual layer 504 that leverages conceptual spaces. In general, conceptual spaces are a proposed framework for knowledge representation by a cognitive system on the conceptual level that provide a natural way of representing similarities. Notably, qualities associated with a particular concept often lie on a sliding scale, as opposed to being strictly binary. Conceptual spaces enable the interaction between different type of representations as an intermediate level between sub-symbolic and symbolic representations.

More formally, a conceptual space is a metric space that allows for the measurement of semantic distances between instances of concepts and for the assignment of weights to their quality dimensions to represent different contexts. Thus, a point in a conceptual space S may be represented by an n-dimensional conceptual vector $v=<d_1, \ldots, d_n>$ where $d_i$ represents the quality value for the $i^{th}$ quality dimension. For example, consider the concept of taste. A conceptual space for taste may include the following dimensions: sweet, sour, bitter, and salty, each of which may be its own dimension in the conceptual space. The taste of a given food can then be represented as a vector of these qualities in a given space (e.g., ice cream may fall farther along the sweet dimension than that of peanut butter, peanut butter may fall farther along the salty dimension than that of ice cream, etc.). By representing concepts within a geometric conceptual space, similarities can be compared in geometric terms, based on the distances between the vectors/points in the space. In addition, similar objects can be grouped into conceptual space regions through the application of a clustering technique.

Said differently, a conceptual space is a framework for representing information that models human-like reasoning to compose concepts using other existing concepts. Note that these representations are not competing with symbolic or associationism (connectivism) representations. Rather, the three kinds can be seen as three levels of representations of cognition with different scales of resolution. Namely, a conceptual space is built up from geometrical representations based on a number of quality dimensions that complements the symbolic and deep learning models of symbolic layer 506 and sub-symbolic layer 502, representing an operational bridge between them. Here, similarity between concepts is just a matter of metric distance between them in the conceptual space in which they are embedded (embedding=semantic representation).

In the particular context of the teachings herein, the concept of "Quality of Experience" may be represented by any or all of the following conceptual domains: 1.) technology, 2.) business, and 3.) hedonic, according to various embodiments. Each property has a certain region in one domain composed of quality dimensions. For example, the Technology domain of the QoE concept may have, not only the quality dimensions of an individual network (e.g., jitter, RSSI, PSNR, etc.), but also the potential choice of networks in the presence of multiple networks and/or the distribution of application flows amongst them if more than one candidate can be used (e.g. in a multi-radio environment). The same approach can be applied to the other domains (e.g., hedonic and business), which define the overall concept of QoE.

- By way of example, consider the following: End users do not need to know the type of network to which they are connecting. On the contrary, the device and mobile operators need to interact to offer the best possible service in a seamless way.
- To maintain the expected QoE, service providers shall deliver the right amount of bandwidth and service at the right cost in some of the hardest to reach/cover wireless environments.
- Differentiation of roles is very useful to segment QoE requirements. A customer who pays for online VoD service has stricter video quality requirement than a user who uses free VoD service, for instance.
- Different organizational domains interact with each other, with different approaches and goals, producing different and sometimes contradictory QoE requirements: (i.) technical personnel provides better QoE improving quality of service (QoS); (ii.) customer relationship management (CRM) people develop new economic models to improve business relationships with customers and retain subscribers; (iii.) service providers want to analyze subscribers' attitudes and demographic profiles, to understand audience behavior.

The conceptual space allows for the discovery of regions that are naturally linked to abstract symbols used in symbolic layer 506, to discover the correlations shared by the three conceptual domains above and the complex interactions among the corresponding user groups, i.e., end users, network operators, content providers. The overall model is bi-directional as it is planned for predictions and action prescriptions depending on the data causing the activation in sub-symbolic layer 502.

Layer hierarchy 500 shown is particularly appealing when matched with the attention mechanism provided by a cognitive system that operates under the assumption of limited resources and time-constraints. For practical applications, the reasoning logic in symbolic layer 506 may be non-axiomatic and constructed around the notion of insufficient knowledge and resources. It may be implemented, for example, with a Non-Axiomatic Reasoning System (NARS) 510. However, other reasoning engines can be used, such as Auto-catalytic Endogenous Reflective Architecture (AERA), can also be used in symbolic layer 506, in further embodiments. In turn, a QoE metric 514 coming from symbolic layer 506 is conceived for prediction (e.g., it can improve just the QoS) and action prescription (e.g., it can be used for provisioning new content or reduce churn rate), depending on the data causing the activation in sub-symbolic layer 502 and in conceptual layer 504.

By way of example of symbolic reasoning, consider the ancient Greek syllogism: (1.) All men are mortal, (2.) Socrates is a man, and (3.) therefore, Socrates is mortal. Depending on the formal language used for the symbolic reasoner, these statements can be represented as symbols of a term logic. For example, the first statement can be represented as "man→[mortal]" and the second statement can be represented as "{Socrates}→man." Thus, the relationship between terms can be used by the reasoner to make inferences and arrive at a conclusion (e.g., "Socrates is mortal"). Non-axiomatic reasoners generally differ from more traditional axiomatic reasoners in that the former applies a truth value to each statement, based on the amount of evidence available, while the latter relies on axioms that are treated as a baseline of truth from which inferences and conclusions can be made.

Detecting, predicting, and preventing known wireless network degradation is highly expensive in terms of compute power and network traffic, due to the need for active testing and time for evaluating information sent by mobile terminals to make resource allocation decisions, especially when the impact of the interruptions in the QoE perceived by mobile users is a critical issue. The space mapping knowledge extraction mechanism inherent to layer hierarchy 500 allows the network quality assessment service to provide greater insight into what is happening in the wireless network under scrutiny. In particular, the layer hierarchy affords the network quality assessment service the following abilities:

The ability to automatically detect anomalies.
The ability to explain decisions and conclusions.
The ability to predict the need for hardware upgrades (maintenance).
The ability to detect overprovisioning and adapt to end user requests.

Figure 6:
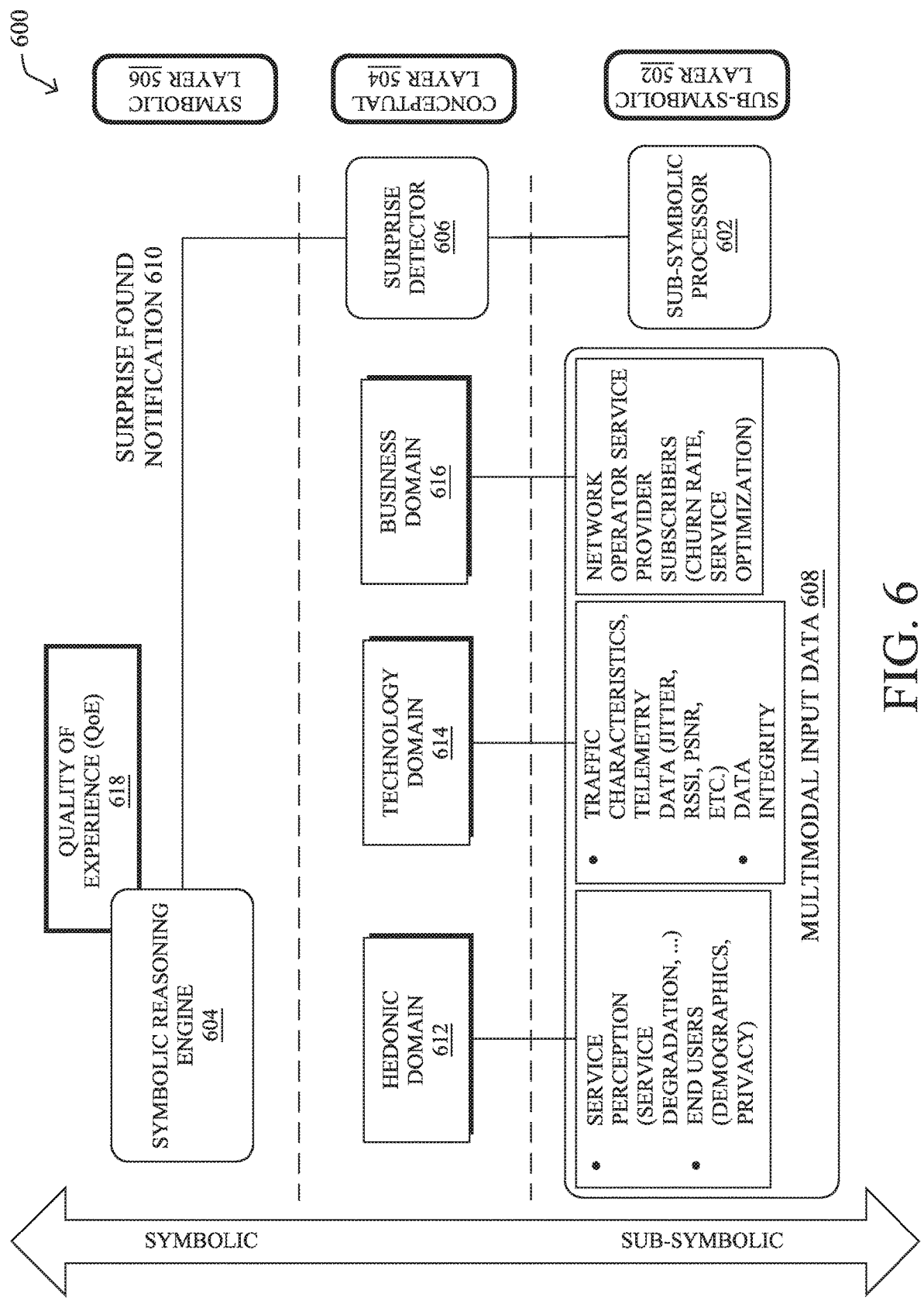
FIG. 6 illustrates an example deep fusion reasoning engine (DFRE) architecture.

FIG. 6 illustrates an example DFRE architecture 600, which may also close the loop between the symbolic and sub-symbolic layers 506, 502, respectively, according to various embodiments. As would be appreciated, the overall concept of a DFRE, such as DFRE 402 described previously, is a cognitive automation solution that combines machine learning and/or deep learning, conceptual spaces, and symbolic reasoning, to meet the various needs of intelligent automation for a network.

In the simplified case of layer hierarchy 500 shown in FIG. 5, the sub-symbolic processors, i.e., the machine learning/deep learning components that process multi-modal data, may be manually defined at design time or system implementation time. Thus, if the system encounters new types of objects, behaviors, temporal patterns, X→Y mappings of any kind at runtime, then the only mechanism available to add these needed sub-symbolic capabilities to the system is further manual intervention such as training new deep learning models to handle the newly required X→Y mappings. Architecture 600 introduces an evolution of this concept that also provides a closed loop system for the automatic detection and generation of new needed sub-symbolic processing subsystems.

As shown, DFRE architecture 600 may include sub-symbolic processor 602 at sub-symbolic layer 502 that takes as input the multimodal input data 608 obtained from the one or more monitored networks. Such multimodal input data 608 may map to various conceptual domains in conceptual layer 504, such as hedonic domain 512, technology domain 614, or business domain 616. In turn, sub-symbolic processor 602 may apply any number of machine learning and/or deep learning models to input data 608 for purposes of detecting network anomalies, predicting failures, making network configuration changes, or the like.

Also as shown, DFRE architecture 600 may include a symbolic reasoning engine 604 at the symbolic layer 506 that leverages conceptual spaces to map the outputs of sub-symbolic processor 602 into a symbolic format for symbolic processing and to output a QoE assessment 618 for the network. Accordingly, in various embodiments, symbolic reasoning engine 604 may comprise a NARS-based, AERA-based, or other suitable symbolic reasoner, to provide explainable QoE metrics for the monitored network(s).

By way of another example, assume that sub-symbolic process 602 performs deep sensor fusion on multimodal input data 608 and, based on the observed telemetry of the wireless network, data indicative of the subjective perceptions of quality by those using the network (e.g., subscriber churn rate, service optimizations, user demographics, user privacy, etc.), the topology of the network, the load of the network, etc. indicated by multimodal input data 608, that a particular wireless AP should be replaced. While useful and likely correct, such a conclusion is also devoid of any justification to the network administrator, as the specific logic used by sub-symbolic process 602 is performed in the hidden layers of the underlying model. However, by executing symbolic reasoning engine 604 on top of sub-symbolic processor 602, this allows the DFRE to explain how the replacement of the AP will affect the QoE 618 in the network.

While the integration of sub-symbolic and symbolic reasoning in a network quality assessment service can be quite powerful, new or unforeseen circumstances in the network could necessitate the generation of new models/subsystems of sub-symbolic processor 602. Accordingly, in various embodiments, DFRE architecture 600 may also include a surprise detector 606 that closes the loop between the symbolic and sub-symbolic layers, to automatically detect and generate new processing subsystems in sub-symbolic processor 602.

During execution, surprise detector 606 may take as input the multimodal input data 608 obtained from the monitored network(s), to detect "surprises" in the sensory information. Typically, surprise detector 606 may be implemented using Bayesian probabilistic techniques, to detect these sub-symbolic changes, although other suitable approaches can be taken, as well. More specifically, surprise detector 606 may use Bayesian deep learning techniques, to take advantage of the Bayesian approximation on the latent space, to detect surprises in data 608.

Said differently, the model(s) of sub-symbolic processor 602 may perform various X→Y mappings of the multimodal input data 608 to higher level representations. By way of example, in the context of image recognition, a deep learning network may map an image to a count of people depicted in the image. Similarly, in the context of wireless networks, assume that a failure prediction model of sub-symbolic processor 602 for an AP takes as input data such as the RSSIs, client counts, etc. of that AP, to predict whether failures are likely at the AP. Now, assume that the client count of the AP typically ranges from 1-10 on any normal day and the model was trained using objective measurements indicative of this typical behavior, as well as subjective measurements indicative of this typical communication ecosystem. However, due to a conference being held in the building on a certain day, the AP now has 50 attached clients, making the failure prediction model unable to map the measurements to a likelihood of failure.

As noted, surprise detector 606 may leverage the latent space representation of multimodal input data 608, to identify subsets of the input data 608 where the current sub-symbolic processes of sub-symbolic processor 602 are unable to create meaningful representations. In one embodiment, surprise detector 606 may do so via a function of the continuous representation in the latent space. However, in other embodiments, surprise detector 606 may detect surprises based on the reconstruction error.

When surprise detector 606 detects a surprise in multimodal input data 608, surprise detector 606 may send a surprise found notification 610 to symbolic reasoning engine 604, to analyze the detected surprise. In turn, symbolic reasoning engine 604 may apply its own reasoning to the raw data in question. For example, symbolic reasoning engine 604 may assess how often this type of data is observed, whether the data is spatially or temporally correlated with other significant events, and may even interface with other external or online sources, to determine whether sub-symbolic processor 602 should be updated.

If symbolic reasoning engine 604 concludes the importance of adding new sub-symbolic processing to sub-symbolic processor 602, to handle this new piece of data, engine 604 may activate various mechanisms, including training its own model using its own experiences and potentially online resources for ground truth. For example, in the case of an AP experiencing a much higher client count than ever, symbolic reasoning engine 604 may identify another AP in the same network, or a different network, that has similar metrics and determine that the failure prediction model for the other AP should be used by sub-symbolic processor 602, to also assess the data 608 regarding the AP under scrutiny. Alternatively, data regarding the other AP can be used to retrain the model for the AP under scrutiny.

In some cases, symbolic reasoning engine 604 may request, via a user interface, a new model from a superuser. Indeed, for certain sensitive applications, there may be a need for a superuser to approve the addition of new sub-symbolic processing subsystems.

Once a new candidate sub-symbolic processing system is generated for sub-symbolic processor 602, the DFRE system may perform A/B testing and/or other procedures, to carefully rollout the new model in parallel to the original model. It may also analyze the differential performance on current and historical data, to ensure that the new system is an improvement, before committing.

Note that the X→Y mappings performed by sub-symbolic processor 602 may also include temporal relations where $X=x_1, x_2, \ldots, x_n$ are snapshots in time from a data stream of any type, which can also be taken into account when updating sub-symbolic processor 602.

Figure 7:
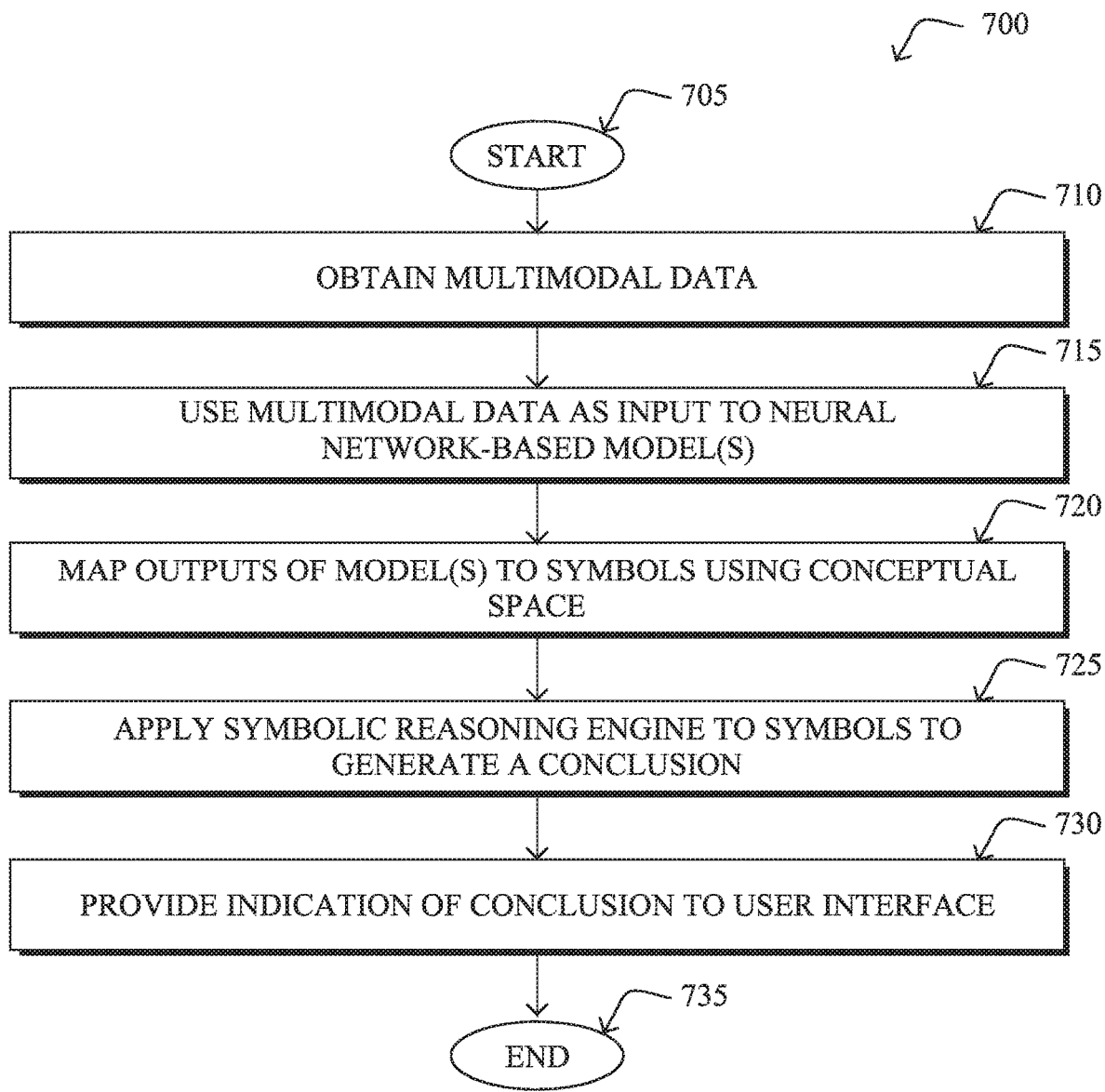
FIG. 7 illustrates an example simplified procedure for providing data regarding a monitored network to a user interface.

FIG. 7 illustrates an example simplified procedure for providing data regarding a monitored network to a user interface, in accordance with one or more embodiments described herein. For example, a non-generic, specifically configured device (e.g., device 200) may perform procedure 700 by executing stored instructions (e.g., process 248), to provide a network quality assessment service to the monitored network. The procedure 700 may start at step 705, and continues to step 710, where, as described in greater detail above, the network quality assessment service obtains multimodal data indicative of a plurality of measurements from the network, as well as data indicative of subjective perceptions of the network by users. For example, the plurality of measurements may include any or all of the following measurements: packet delays, packet drops, jitter, received signal strength indicator (RSSI), or Peak Signal to Noise Ratio (PSNR). In addition, in some embodiments, the data indicative of the subjective perceptions of the quality of the network by the users may include information regarding the demographics of the users of the network, service degradation information, subscriber pricing information, subscriber churn rate data, service optimizations, user privacy information, or the like.

At step 715, as detailed above, the network quality assessment service may use the obtained multimodal data as input to one or more neural network-based models. For example, the network quality assessment service may use the obtained multimodal data as input to a deep learning model for purposes such as detecting anomalies in the network, predicting failures in the network, or the like.

At step 720, the network quality assessment service may map, using a conceptual space, outputs of the one or more neural network-based models to symbols, as described in greater detail above. As would be appreciated, such a conceptual space may comprise any number of domains that define a given concept, such as QoE in the monitored network. By doing so, the outputs of the sub-symbolic model(s) from step 715 can be mapped to symbols for consumption by a symbolic reasoning engine.

At step 725, as detailed above, the network quality assessment service may apply a symbolic reasoning engine to the symbols, to generate a conclusion regarding the monitored network. Notably, by making inferences on the symbolic representations of the model outputs, the symbolic reasoning engine is able to reach a conclusion regarding the network.

At step 730, the network quality assessment service may provide an indication of the conclusion to a user interface, as described in greater detail above. For example, the service may suggest a recommended change to the network that also explains how the change would affect the QoE in the network and why. In contrast to traditional machine learning approaches that offer no explanation due to their black box natures, the merging of the sub-symbolic processing and symbolic reasoning allows for greater analysis of the network in a manner that is explainable to the user. Procedure 700 then ends at step 735.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Accordingly, a DFRE-based architecture is introduced that allows for network quality assessment in an explainable manner. In some aspects, the techniques herein also have the ability to detect the need for new sub-symbolic processing, as well as delete, modify, and add new sub-symbolic processing in an automated fashion.

While there have been shown and described illustrative embodiments that provide for explainable QoE metrics in a network, it is to be understood that various other adaptations and modifications may be made within the spirit and scope of the embodiments herein. For example, while certain embodiments are described herein with respect to using certain models for purposes of assessing the operation of a wireless network, the models are not limited as such and may be used for other functions, such as assessing hardwired networks, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   obtaining, by a network quality assessment service that monitors a network as part of a network quality assessment infrastructure within the network, multimodal data indicative of: a) a plurality of measurements from the network that are indicative of network performance and b) factors that influence subjective perceptions of users of the network, wherein the factors that influence the subjective perceptions of users comprise one or more of: demographics information, subscriber churn rate, or user privacy information;
   using, by the network quality assessment service, the obtained multimodal data as input to one or more neural network-based models;
   mapping, by the network quality assessment service and using a conceptual space, outputs of the one or more neural network-based models to symbols, wherein the conceptual space comprises a metric space that allows a) measurement of semantic distances between instances of concepts and b) assignment of weights to quality dimensions of the concepts that represent different contexts;
   applying, by the network quality assessment service, a symbolic reasoning engine to the symbols, to generate a conclusion regarding the monitored network; and
   providing, by the network quality assessment service, an indication of the conclusion to a user interface.

2. The method as in claim 1, wherein the plurality of measurements from the network comprises one or more of: packet delays, packet drops, jitter, received signal strength indicator (RSSI), or Peak Signal to Noise Ratio (PSNR).

3. The method as in claim 1, wherein one or more neural network-based models comprise a deep learning model.

4. The method as in claim 1, wherein the conceptual space represents quality of experience (QoE) in the network as a concept comprising a plurality of domains.

5. The method as in claim 1, further comprising:
   using a surprise detector to detect unexpected data in the obtained multimodal data; and, in response,
   automatically adjusting the one or more neural network-based models.

6. The method as in claim 5, wherein automatically adjusting the one or more neural network-based models comprises:
   using the symbolic reasoning engine to determine that the one or more neural network-based models should be adjusted, based on the detected unexpected data in the obtained multimodal data.

7. The method as in claim 5, wherein automatically adjusting the one or more neural network-based models comprises:
   adding a model for the unexpected data to the one or more neural network-based models.

8. The method as in claim 1, wherein the symbolic reasoning engine is non-axiomatic.

9. An apparatus, comprising:
   one or more network interfaces to communicate with a monitored network;
   a processor coupled to the network interfaces and configured to execute one or more processes; and
   a memory configured to store a process executable by the processor, the process when executed configured to:
      obtain multimodal data indicative of: a) a plurality of measurements from the network that are indicative of network performance and b) factors that influence subjective perceptions of users of the network, wherein the factors that influence the subjective perceptions of users comprise one or more of: demographics information, subscriber churn rate, or user privacy information;
      use the obtained multimodal data as input to one or more neural network-based models;
      map, using a conceptual space, outputs of the one or more neural network-based models to symbols, wherein the conceptual space comprises a metric space that allows a) measurement of semantic distances between instances of concepts and b) assignment of weights to quality dimensions of the concepts that represent different contexts;
      apply a symbolic reasoning engine to the symbols, to generate a conclusion regarding the monitored network; and
      provide an indication of the conclusion to a user interface.

10. The apparatus as in claim 9, wherein the plurality of measurements comprises one or more of: packet delays, packet drops, jitter, received signal strength indicator (RSSI), or Peak Signal to Noise Ratio (PSNR).

11. The apparatus as in claim 9, wherein one or more neural network-based models comprise a deep learning model.

12. The apparatus as in claim 9, wherein the conceptual space represents quality of experience (QoE) in the network as a concept comprising a plurality of domains.

13. The apparatus as in claim 9, wherein the process when executed is further configured to:
   use a surprise detector to detect unexpected data in the obtained multimodal data; and, in response,
   automatically adjust the one or more neural network-based models.

14. The apparatus as in claim 13, wherein the apparatus automatically adjusting the one or more neural network-based models by:

using the symbolic reasoning engine to determine that the one or more neural network-based models should be adjusted, based on the detected unexpected data in the obtained multimodal data.

15. The apparatus as in claim 13, wherein the apparatus automatically adjusting the one or more neural network-based models by:

adding a model for the unexpected data to the one or more neural network-based models.

16. The apparatus as in claim 9, wherein the symbolic reasoning engine is non-axiomatic.

17. A tangible, non-transitory, computer-readable medium storing program instructions that cause a network quality assessment service that monitors a network to execute a process comprising:

obtaining, by the network quality assessment service that is part of a network quality assessment infrastructure within the network, multimodal data indicative of: a) a plurality of measurements from the network that are indicative of network performance and b) factors that influence subjective perceptions of users of the network, wherein the factors that influence the subjective perceptions of users comprise one or more of: demographics information, subscriber churn rate, or user privacy information;

using, by the network quality assessment service, the obtained multimodal data as input to one or more neural network-based models;

mapping, by the network quality assessment service and using a conceptual space, outputs of the one or more neural network-based models to symbols, wherein the conceptual space comprises a metric space that allows a) measurement of semantic distances between instances of concepts and b) assignment of weights to quality dimensions of the concepts that represent different contexts;

applying, by the network quality assessment service, a symbolic reasoning engine to the symbols, to generate a conclusion regarding the monitored network; and providing, by the network quality assessment service, an indication of the conclusion to a user interface.

18. The computer-readable medium as in claim 17, wherein one or more neural network-based models comprise a deep learning model.

19. The computer-readable medium as in claim 17, wherein the symbolic reasoning engine is non-axiomatic.

20. The computer-readable medium as in claim 17, wherein the plurality of measurements comprises one or more of: packet delays, packet drops, jitter, received signal strength indicator (RSSI), or Peak Signal to Noise Ratio (PSNR).

* * * * *